United States Patent
Boudreau et al.

(10) Patent No.: US 9,071,922 B2
(45) Date of Patent: Jun. 30, 2015

(54) DISTRIBUTED V-MIMO PROCESSING FOR COORDINATED MULTIPOINT RECEPTION

(71) Applicants: Gary David Boudreau, Kanata (CA); Adrien Joseph Comeau, Ottawa (CA)

(72) Inventors: Gary David Boudreau, Kanata (CA); Adrien Joseph Comeau, Ottawa (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 242 days.

(21) Appl. No.: 13/661,360

(22) Filed: Oct. 26, 2012

(65) Prior Publication Data

US 2014/0119276 A1    May 1, 2014

(51) Int. Cl.
   *H04W 4/00*   (2009.01)
   *H04L 1/00*   (2006.01)

(52) U.S. Cl.
   CPC .......... *H04W 4/00* (2013.01); *H04L 1/0076* (2013.01); *H04L 2001/0093* (2013.01); *H04L 2001/0097* (2013.01)

(58) Field of Classification Search
   CPC .............................. H04W 88/08; H04J 11/00
   USPC ............... 370/329, 338, 252, 328, 203, 331;
                          455/63.1, 69, 436, 452.2, 501, 450;
                                                              375/260
   See application file for complete search history.

(56) References Cited

U.S. PATENT DOCUMENTS

| | | | | |
|---|---|---|---|---|
| 5,499,243 | A * | 3/1996 | Hall | 370/346 |
| 7,773,947 | B2 * | 8/2010 | Gerlach | 455/63.1 |
| 8,644,397 | B2 | 2/2014 | Gaal et al. | |
| 8,655,281 | B2 * | 2/2014 | Wu et al. | 455/63.1 |
| 2002/0119780 | A1 | 8/2002 | Roux et al. | |
| 2010/0246524 | A1 | 9/2010 | Hou et al. | |
| 2011/0293028 | A1 | 12/2011 | Panicker et al. | |
| 2012/0184218 | A1 | 7/2012 | Boudreau et al. | |

FOREIGN PATENT DOCUMENTS

| | | |
|---|---|---|
| WO | 2005062494 | 7/2005 |
| WO | 2010034528 | 4/2010 |
| WO | 2012095759 | 7/2012 |

OTHER PUBLICATIONS

Fujitsu, "An Efficient Reference Signal Design in LTE Advanced", 3GPP TSG-RAN1 #56, Feb. 9, 2009, pp. 1-13, Athens, Greece, R1-090949.

(Continued)

*Primary Examiner* — Chandrahas Patel

(74) *Attorney, Agent, or Firm* — Coats & Bennett, PLLC

(57) ABSTRACT

The base stations in a coordinating set, i.e., CoMP set, implement distributed V-MIMO processing to decode uplink signals transmitted from multiple user terminals over the same time and frequency resources. Each base station uses the extrinsic information received from its coordinating base stations to facilitate demodulation and decoding. In the event that one of the base stations successfully decodes an uplink signal, it may provide the decoded data to the other coordinating base stations in the coordinating set. In this case, the coordinating base stations do not need to decode the uplink signal. Even if the uplink signal is not successfully decoded, the demodulated data received from the coordinating base station increases the likelihood of successfully decoding uplink signal in the next iteration of a HARQ process.

30 Claims, 12 Drawing Sheets

(56) References Cited

OTHER PUBLICATIONS

Wild, T., et al., "Joint Channel Estimation across Multiple Cells in Coordinated Multi-Point", 2012 International Symposium on Wireless Communication Systems (ISWCS), IEEE, Aug. 28, 2012, pp. 845-849, XP032263879.

Nokia Siemens Networks, et al., "On DM RS Enhancements for UL CoMP", 3GPP TSG RAN WG1 Meeting #68, Feb. 6, 2012, pp. 1-7, Dresden, Germany, R1-120727.

Irmer, R., et al., "Coordinated Multipoint: Concepts, Performance, and Field Trial Results", IMT-Advanced and Next-Generation Mobile Networks, IEEE Communications Magazine, Feb. 1, 2011, pp. 102-111, vol. 49, No. 2, XP055003502.

Comeau, A. "Adaptive Uplink Coordinated Multipoint Communication for Backhaul." U.S. Appl. No. 13/587,592, filed Aug. 16, 2012.

Brück, S., "Backhaul Requirements for Centralized and Distributed Cooperation Techniques," Jul. 8, 2010, pp. 1-14, [retrieved on Aug. 22, 2013], retrieved from internet: http://www.ikr.uni-stuttgart.de/Content/itg/fg524/Meetings/2010-07-08-Heidelberg/09_ITG524_Heidelberg_Brueck.pdf, Qualcomm CDMA Technologies.

* cited by examiner

DISTRIBUTED V-MIMO PROCESSING FOR COORDINATED MULTIPOINT RECEPTION

TECHNICAL FIELD

The present invention relates generally to coordinated multipoint (CoMP) reception of uplink signals in a wireless communication network and, more particularly, to distributed V-MIMO processing of uplink transmissions in a wireless communication network employing CoMP reception.

BACKGROUND

The phenomenal growth in demand for wireless communications has put persistent pressure on wireless network operators to improve the capacity of their communication networks. To improve the spectral efficiency of these networks, scarce radio resources have to be reused aggressively in neighboring cells. As a result, inter-cell interference has become a main source of signal disturbance, limiting not only the service quality to users at the cell edges, but also the overall system throughput.

Coordinated Multi-Point (CoMP) reception in the uplink is one technique being considered for mitigating inter-cell interference in International Mobile Telecommunications (IMT) Advanced systems. CoMP reception differs from reception in a conventional system in that uplink signals are received at multiple, geographically dispersed base stations, and then sent across backhaul communication links to a common location for joint processing (e.g., to the serving base station). In effect, this architecture forms a "super-cell," called a CoMP cell, where uplink signals that would have been treated by a conventional cell as inter-cell interference are instead treated by the CoMP cell as desired signals. The mitigation in inter-cell interference is expected to significantly improve system performance, especially for users near the edge of a conventional cell.

Sending the received uplink signals across backhaul communication links for joint processing, however, can require significant and potentially prohibitive backhaul bandwidth. For many transmissions, the coordinating node is under a stringent time deadline to deliver the CoMP payload to the serving node for processing. For example, it is desirable that the uplink signals received by a cooperating node be processed and the CoMP payload delivered to the serving node within the time deadline for Hybrid Automatic Repeat Request (HARQ). In Long Term Evolution (LTE) systems, the HARQ timing is typically set to 4 ms, so that the HARQ process can assist in exploiting the short term behavior of the wireless channel. Usual solutions deliver the CoMP payload with a latency of less than 500 µs, which allows the payload to be useful to the serving cell within the HARQ deadline. The requirement for low latencies drives the peak data rates on the backhaul and requires very high bandwidth on the backhaul.

The synchronous nature of the cells also contributes to the high peak data rates. Because the transmission in all cells is synchronous, the CoMP payloads from many different nodes may be transmitted over the backhaul at the same time causing peak congestion. The average utilization of the links will be low, while the short peaks drive the bandwidth requirement and link costs.

Processing loads for processing the CoMP payloads is another area of concern. Solutions that minimize the processing load for CoMP operations are advantageous.

SUMMARY

In an exemplary embodiment of the invention, the base stations in a coordinating set, i.e., CoMP set, implement distributed Virtual Multiple Input, Multiple Output (V-MIMO) processing to decode uplink signals transmitted from multiple user terminals over the same time and frequency resources. Each base station uses the extrinsic information received from its coordinating base stations to facilitate demodulation and decoding. In the event that one of the coordinating base stations successfully decodes an uplink signal, it may provide the decoded data to the other coordinating base stations in the coordinating set. In this case, the coordinating base stations do not need to decode the uplink signal. Even if the uplink signal is not successfully decoded, the demodulated data received from the coordinating base station increases the likelihood of successfully decoding signal $s_{ij}$ in the next iteration of the HARQ process. As a result, it will take fewer HARQ iterations on average to successfully decode the uplink signals from the user terminals, thus reducing the number of retransmissions. Reduction in the retransmission results in lower bandwidth requirements on the backhaul and a lower processing load on the base stations.

According to one exemplary embodiment, a method implemented by a coordinating base station in a wireless communication network of distributed coordinated multi-point reception is disclosed. The coordinating base station receives first and second data signals transmitted by first and second user terminals respectively on overlapping time-frequency resources, decodes the first and second data signals, and verifies whether the decoding of the first and second data signals is successful. If it is determined that at least one of the first and second data signals is successfully decoded, the base station sends demodulated data or decoded data corresponding to at least one successfully decoded data signal to one or more additional coordinating base stations in a set of coordinating base stations.

In the same or another embodiment, a base station in a wireless communication network is disclosed. The base station includes a transceiver circuit for receiving first and second data signals on overlapping time-frequency resources from first and second user terminals respectively, and a backhaul interface for communicating with coordinating base stations in a set of coordinating base stations. The base station also includes a processing circuit for processing the received data signals. The processing circuit is configured to: decode the first and second data signals; verify whether the decoding of the first and second data signals is successful; and if it is determined that at least one of the first and second data signals is successfully decoded, send demodulated data or decoded data corresponding to at least one successfully decoded data signal to one or more additional coordinating base stations in the set of coordinating base stations.

DETAILED DESCRIPTION

Figure 1:
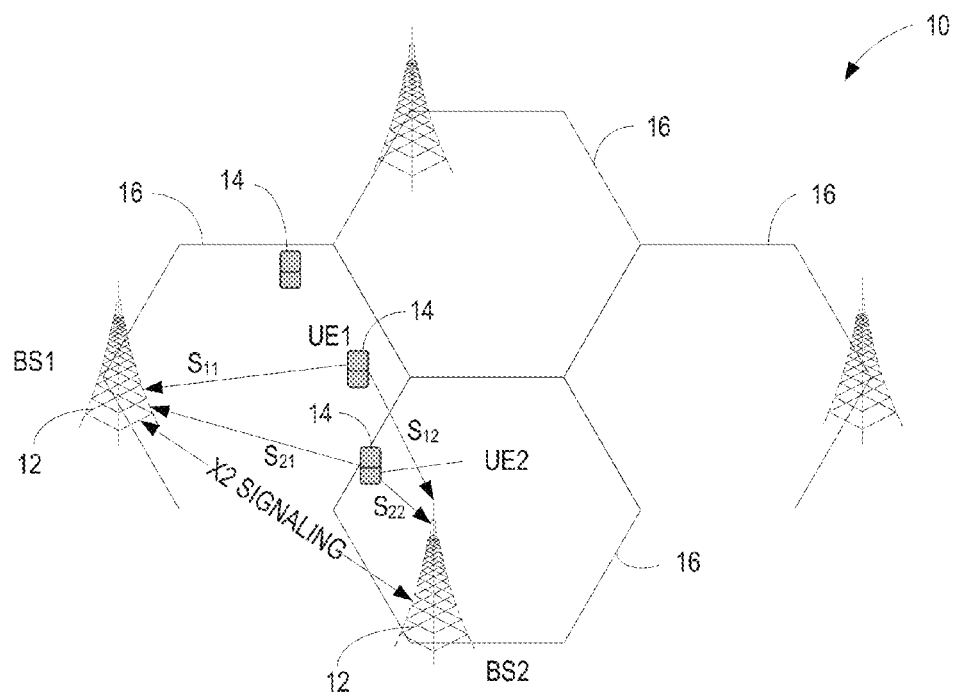
FIG. 1 illustrates a wireless communication network implementing Coordinated Multipoint Reception (CoMP) with distributed V-MIMO processing.

Referring now to the drawings, FIG. 1 illustrates one embodiment of a coordinated multipoint (CoMP) system 10 according to one exemplary embodiment of the invention. The CoMP system 10 comprises a plurality of geographically dispersed base stations 12 providing service to user terminals 14 in respective cells 16 of the CoMP system 10. In FIG. 1, two base stations 12 and two user terminals 14 are illustrated. The base stations 12 are denoted BS1 and BS2, respectively. The user terminals 14 are denoted UE1 and UE 2, respectively. BS1 is the serving base station 12 for UE1, while BS2 is the serving base station 12 for UE2.

In a CoMP system 10, the uplink signals transmitted from the user terminals 14 are received by multiple base stations 12 within a designated CoMP set. For purposes of this application, the term "coordinating base station 12" refers to any base station 12 in a coordinating set (i.e. the "CoMP set"). The term "serving base station" is the coordinating base station that is selected to serve a particular user terminal 14. For a given user terminal 14, the coordinating set includes a serving base station 12 and at least one other coordinating base station 12.

In the example shown in FIG. 1, the CoMP set for both UE1 and UE2 includes BS1 and BS2. BS1 is a serving base station 12 for UE1, while BS2 is a coordinating base station 12 for UE2. BS2 is the serving base station for UE2, and BS1 is a coordinating base station 12 for UE2. Those skilled in the art will appreciate that the CoMP sets for UE1 and UE2 may include additional base stations in addition to BS1 and BS2. For purposes of explanation, the discussion that follows will focus on a single coordinating base station, BS1 or BS2. However, the principles described can be easily extended to two or more coordinating base stations.

In embodiments of the present invention, the base stations 12 uses a spatial multiplexing technique known as Virtual Multiple Input, Multiple Output (V-MIMO) to receive uplink signals from multiple user terminals 14 on the same time and frequency resources. In this kind of example, BS1 and BS2 receive uplink signals from both UE1 and UE2. The uplink signals are denoted as $s_{ij}$, where i indicates the user terminal 14 and j indicates the base station 12. Thus, BS1 receives uplink signals $s_{11}$ and $s_{21}$ from UE1 and UE2, respectively. BS2 receives uplink signals $s_{12}$ and $s_{22}$ from UE1 and UE2 respectively.

Figure 2:
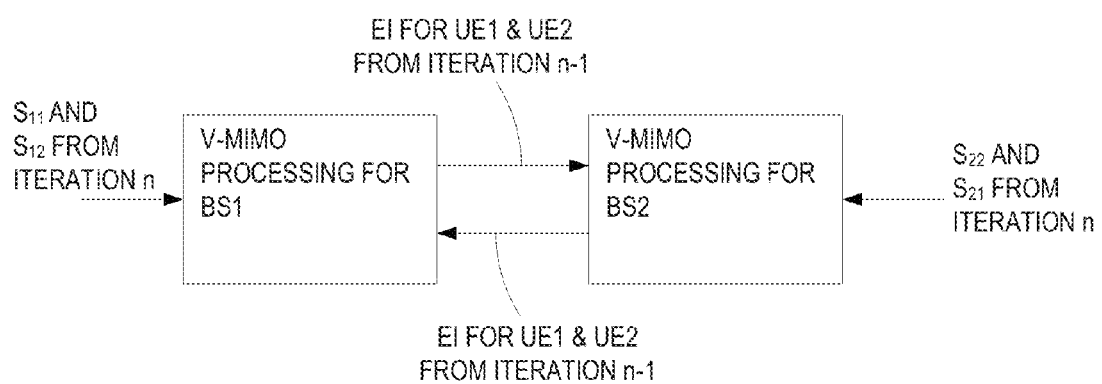
FIG. 2 is a schematic illustration of distributed V-MIMO processing for uplink transmissions.

The base stations 12 process the received uplink signals $s_{ij}$ in a distributed manner and exchange extrinsic information (EI). The uplink signals $s_{ij}$ received by a base station 12 in a given iteration of a Hybrid Automatic Repeat Request (HARQ) process are sampled and combined with extrinsic information from a previous iteration of the HARQ process. The extrinsic information is received from a coordinating base station 12. FIG. 2 illustrates how extrinsic information is used to perform V-MIMO processing at each of the base stations 12. As seen in FIG. 2, the uplink signals $s_{11}$ and $s_{21}$ are input to the V-MIMO processing function at BS1. The V-MIMO processing function also receives from BS2 extrinsic information for UE1 and UE2 from iteration n−1. BS2 receives uplink signals $s_{12}$ and $s_{22}$ in iteration n of the HARQ process. BS2 also receives extrinsic information from BS1 for UE1 and UE2 from iteration n−1.

The extrinsic information exchanged by the base stations 12 may, for example, comprise decoded data if the base station 12 providing the extrinsic information successfully decodes the uplink signal $s_{ij}$, or demodulated data if the decoding of the uplink signal $s_{ij}$ is not successful. The demodulated data may, for example, comprise soft output values, e.g., log likelihood ratios (LLRs). The V-MIMO processing function at each base station 12 uses the extrinsic information from iteration n−1 of the HARQ process to facilitate the demodulation and decoding of the uplink signals $s_{ij}$ received in iteration n of the HARQ process. In the event that one of the base stations 12 successfully decodes an uplink signal $s_{ij}$, it may provide the decoded data to the other coordinating base stations 12 in the coordinating set. In this case, the coordinating base stations 12 do not need to decode the uplink signal $s_{ij}$. Even if the uplink signal $s_{ij}$ is not successfully decoded in iteration n−1, the demodulated data received from the coordinating base station 12 increases the likelihood of successfully decoding signal $s_{ij}$ in iteration n of the HARQ process. As a result, it will take fewer HARQ iterations on average to successfully decode the uplink signals $s_{ij}$, thus reducing the number of retransmissions. Reduction in the retransmission results in lower bandwidth requirements on the backhaul and a lower processing load on the base stations.

Figure 3:
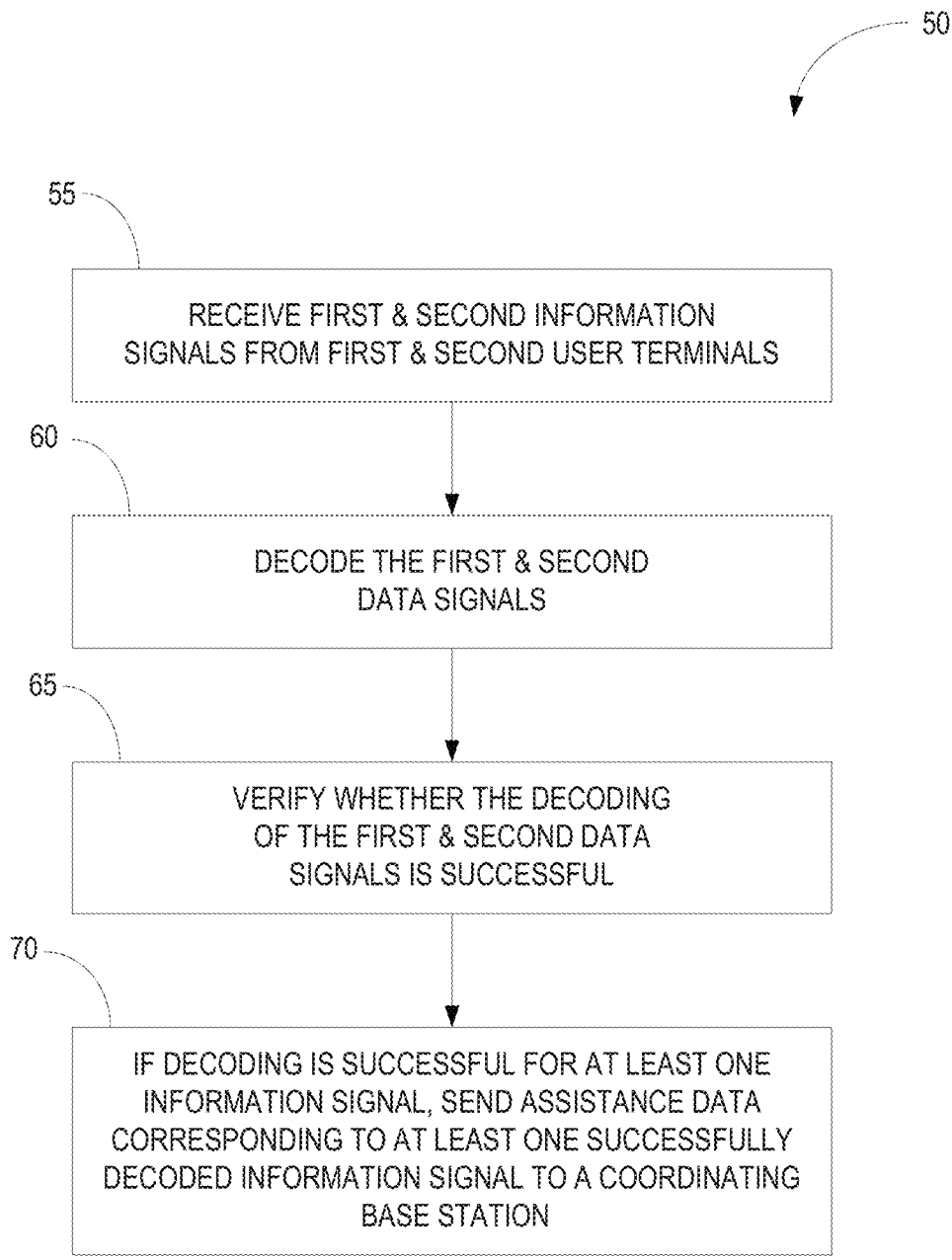
FIG. 3 illustrates a method performed by a coordinating base station implementing distributed V-MIMO processing for uplink transmissions.

FIG. 3 illustrates an exemplary distributed decoding method 50 according to one exemplary embodiment. The method 50 shown in FIG. 3 is performed in a single iteration of a HARQ process and may be repeated in successive iterations of the HARQ process. The method 50 begins when the base station 12 receives first and second data signals from first and second user terminals, respectively (block 55). The first and second data signals are received on resources that overlap in time and frequency. The uplink signals may overlap completely in the time and frequency domains, or overlap partially in the time and/or frequency domains. The base station 12 decodes the first and second data signals using spatial multiplexing techniques as hereinafter described (block 60). The decoding may use extrinsic information received from a coordinating base station 12. In some embodiments, the extrinsic information is derived from uplink signals transmitted in a previous iteration of the current HARQ process. In other embodiments, where low latency for inter-base station communication can be achieved, the extrinsic information may be derived from uplink signals received at coordinating base stations 12 in the same iteration of the HARQ process.

After decoding, the base station 12 verifies whether the decoding of the first and second data signals is successful (block 65). Verification may be performed using a cyclic redundancy check (CRC) or other error detection code. If the decoding is successful, for at least one data signal, the base station 12 sends extrinsic data corresponding to the successfully decoded data signal to a coordinating base station 12 in its coordinating set (block 70). The extrinsic information may comprise the decoded data (i.e., decoded data signal). In other embodiments, the extrinsic information may comprise demodulated data (e.g., soft output values) corresponding to the successfully decoded data signal.

Figure 4:
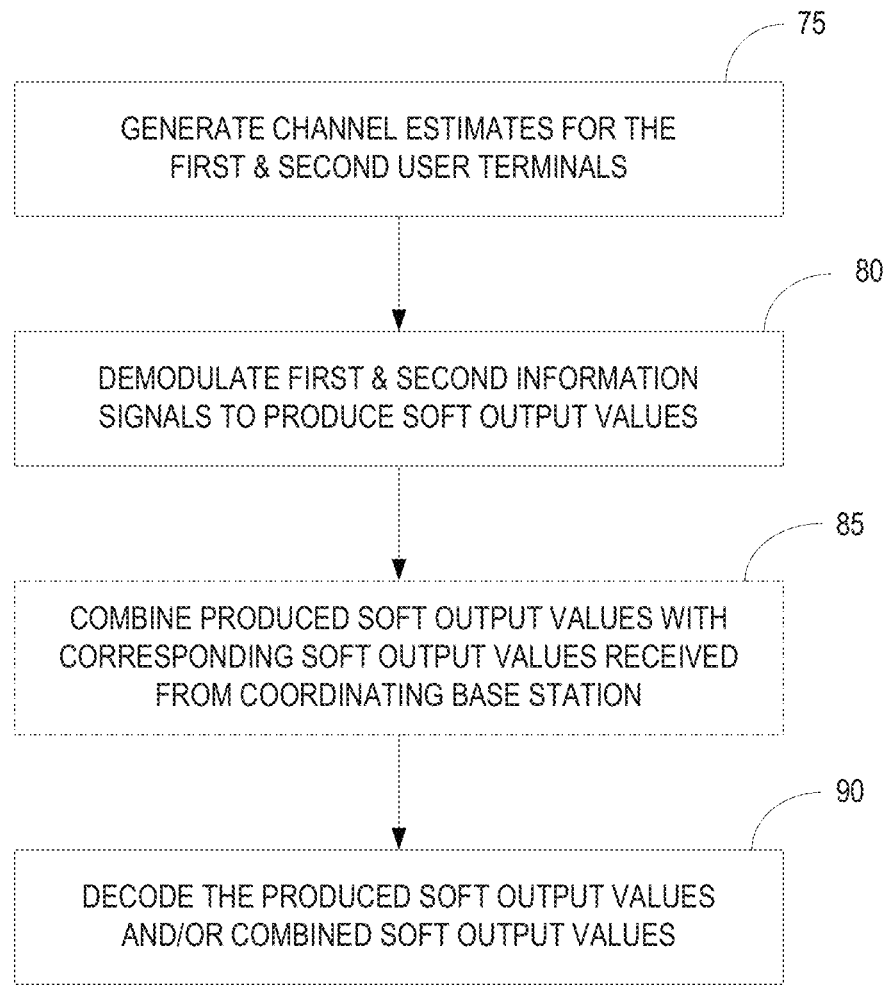
FIG. 4 illustrates a decoding method implemented by a coordinating base station.

FIG. 4 illustrates the processing involved in decoding the data signals (block 60 of FIG. 3) in more detail. To perform decoding of the first and second data signals, the base station 12 first generates channel estimates for the first and second user terminals (block 75). The base station 12 then demodulates the first and second data signals using the channel estimates to produce soft output values (block 80). In some embodiments of the invention, the base station 12 may receive extrinsic information from a coordinating base station 12 in the form of soft output values. In this case, the base station 12 may optionally combine the produced soft output values with corresponding soft output values received from the coordinating base station 12 (block 85). The base station 12 then decodes the produced soft output values and/or combined soft output values (block 90).

As noted above, the extrinsic information received from a coordinating base station 12 may comprise decoded data signals. In this case, the base station 12 does not need to demodulate and decode the uplink signal that was already successfully decoded by the coordinating base station 12. The decoded data signal received from the coordinating base station 12, however, can be used to perform interference cancellation to increase the likelihood of successfully decoding other uplink signals. For example, when BS2 successfully decodes the uplink signal from UE1, it may provide the decoded data to BS1. In this case, BS1 does not need to decode the uplink signal $s_{11}$ from UE1. The decoded signal, however, may be used to cancel interference in the combined received signal attributable to UE1 and thereby improve the likelihood of successfully decoding the uplink signal $s_{21}$ from UE2.

In the case of V-MIMO with two user terminals 14 transmitting on the same resources, the combined reference signal y after a N-point Fast Fourier Transform (FFT) at the base station 12 can be written as:

$$y = X_1 h_1 + X_2 h_2 + n \qquad \text{Eq. (1)}$$

where $X_1$ and $X_2$ are the reference sequences from UE1 and the UE2 respectively, $h_1$ and $h_2$, are the frequency domain complex channel response vectors of UE1 and UE2 respectively, and n is the additive white Gaussian noise with a variance $\sigma_n^2$. The reference sequences $X_1$ and $X_2$ can be, for example, Sounding Reference Symbols (SRSs) or UE-specific Channel State Information Reference Symbols (CSI-RSs) for LTE Release 10 user terminals 14.

A simple reduced complexity minimum mean square error (MMSE) channel estimation technique based on a simple matrix inversion of $X_1$ is possible if the second term in Eq. (1) is absent. More particularly, a least square (LS) channel estimate may be computed according to:

$$\hat{H}_{LS} = X^{-1} y \qquad \text{Eq. (2)}$$

The LS channel estimate can then be refined using an MMSE correlation matrix R to obtain a reduced complexity MMSE channel estimates $\hat{H}_{MMSE}$. The reduced complexity MMSE channel estimates $\hat{H}_{MMSE}$ may be computed according to:

$$\hat{H}_{MMSE} = R\left(R + \frac{\beta}{SNR} I\right)^{-1} \hat{H}_{LS} \qquad \text{Eq. (3)}$$

where R is the MMSE correlation matrix, SNR is the signal to noise ratio, and $\beta$ is the relative gain of the amplitude of the UE signal under consideration.

In the case of V-MIMO, because of the interfering users, interference cancellation or interference suppression techniques are applied prior to calculation of the LS channel estimates to enable the computation of the reliable MMSE channel estimates. In one exemplary embodiment, the base station 12 takes advantage of advance information on the reference sequences $X_1$ and $X_2$, either through measurement of the reference sequences or exchange of information from neighboring coordinating cells. If some form of frequency domain channel estimates for UE1 and UE2 are available, then the base station 12 can approximately estimate the interfering reference signal and subtract the interference from the received signal before generating the LS channel estimates. For example, user terminals 14 in idle mode and traffic mode transmit periodic sounding reference signal (SRS). The bandwidth and periodicity of the SRS transmissions by the user terminals 14 can be programmed through higher layer signaling messages. The SRS-based channel estimates may be used as one possible input for the regeneration of the interfering reference signals in Eq. (1). In low mobility scenarios (i.e., <60 km/hr), the previous SRS-based channel estimates are usually sufficiently accurate to regenerate approximately the reference signals from each user terminal 14. After cancelling the interference, the LS channel estimate for each user terminal may be computed for UE1 and UE 2 respectively according to:

$$\hat{H}_{Ls1} = X_1^{-1} y_1 \qquad \text{Eq. (4)}$$

$$\hat{H}_{Ls2} = X_2^{-1} y_2 \qquad \text{Eq. (5)}$$

where $y_1$ and $y_2$ are the interference canceled signals for UE1 and UE2 respectively.

The MMSE channel estimates may be used to demodulate and decode uplink signals received from UE1 and UE2. The combined received signal received at each base station can be written as:

$$y_{data} = d_1 h_1 + d_2 h_2 + n \qquad \text{Eq. (6)}$$

where $d_1$ and $d_2$ are the arbitrary data sequences from UE1 and the UE2 respectively, $h_1$ and $h_2$ are the frequency domain complex channel response vectors of UE1 and UE2 respectively, and n is the additive white Gaussian noise with a variance $\sigma_n^2$. It is easily seen that the received data sequence $y_{data}$ contains a sum of the data channel vector from both users. Unlike the case with reference sequences $X_1$ and $X_2$, the data sequences $d_1$ and $d_2$ of the users are unknown to the base station 12. Consequently, interference cancellation prior to demodulation is not possible without extrinsic information. In exemplary embodiments of the invention described below, the extrinsic information generated or received by a base station 12 from uplink signal $s_{ij}$ received in iteration n−1 of a HARQ process may be used for interference cancellation in iteration n of the HARQ process.

Figure 5:
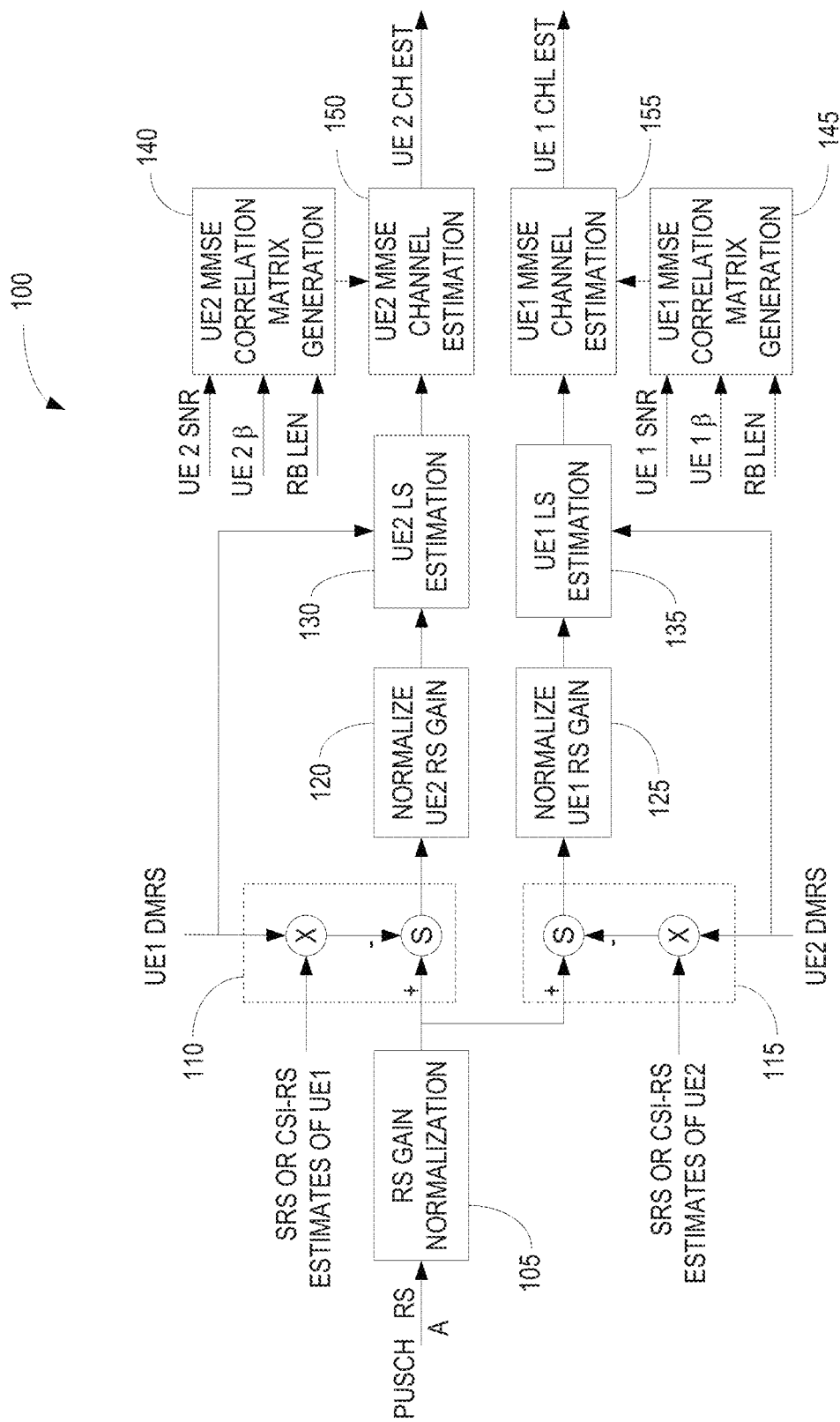
FIG. 5 illustrates a channel estimation method of channel estimation for distributed V-MIMO processing of uplink signals.

FIG. 5 illustrates an exemplary V-MIMO channel estimation method. To simplify explanation, it is assumed that uplink signals containing demodulation reference signals (DMRS) are received simultaneously from UE1 and UE2 on the same resource blocks. The uplink signals are received on the Physical Uplink Shared Channel ("PUSCH"). It is further assumed that the DMRS is known for both of the user terminals 14 and that buffered CSI-RS or SRS-based channel estimates for UE1 and UE2 are available.

An N-point Fast Fourier Transform ("FFT") is performed on the composite reference signal by base station 12 to obtain a frequency domain signal. The resource blocks ("RB") in the frequency domain signal allocated to UE1 and UE2 are isolated. This signal corresponds to the received signal y in Eq. (1). The gain of the received signal y is normalized (block 105).

The buffered channel estimates $\{\hat{h}_1\}$ reference sequences $X_1$ are used to regenerate the terms $\{X_1\hat{h}_1\}$ and cancel it from the received composite signal to obtain an estimate of the reference signal from UE2 (block 110). The interference canceled reference signal from UE2, denoted $\hat{y}_{UE2}$, is given by:

$$\hat{y}_{UE2} = y - X_1\hat{h}_1 \approx y_2 h_2 + n \qquad \text{Eq. (7)}$$

Similarly, the buffered channel estimates $\{\hat{h}_1\}$ and reference signal $X_2$ are used to regenerate the term $\{X_2\hat{h}_2\}$ and subtract it from the received composite signal to obtain an estimate of the reference signal from UE1 (block 115). The interference canceled reference signal for UE1, denoted $\hat{y}_{UE1}$, given by:

$$\hat{y}_{UE1} = y - X_2\hat{h}_2 \approx y_1 h_1 + n \qquad \text{Eq. (8)}$$

The gain of $\hat{y}_{UE1}$ is normalized (block 120) and the least square ("LS") channel estimate $\hat{H}_{Ls1}$ of UE1 is generated (block 130). Similarly, the gain of $\hat{y}_{UE2}$ is normalized (block 125) and the least square ("LS") channel estimate $\hat{H}_{Ls2}$ of UE 2 is generated (block 135). The LS channel estimates $\hat{H}_{Ls1}$ and $\hat{H}_{Ls2}$ may be computed respectively according to:

$$\hat{H}_{LS1} = X_1^{-1} y_{UE2} \qquad \text{Eq. (9)}$$

$$\hat{H}_{LS2} = X_2^{-1} y_{UE1} \qquad \text{Eq. (10)}$$

The LS channel estimates for UE1 and UE2 may be used to generate reduced complexity MMSE channel estimates denoted $\hat{H}_{MMSE1}$ and $\hat{H}_{MMSE1}$ respectively (blocks 150, 155). The MMSE correlation matrix for UE1 is computed from the signal-to-interference-plus-noise ratio (SNR), β, and resource block length (RBL) for UE1 (block 140). The MMSE channel estimate may then be computed at block 150 according to:

$$\hat{H}_{MMSE1} = R_{HH}\left(R_{HH} + \frac{\beta}{SNR_1}I\right)^{-1}\hat{H}_{LS1} \qquad \text{Eq. (11)}$$

The MMSE correlation matrix for UE2 is computed from the signal-to-interference-plus-noise ratio (SNR), β, and resource block length (RBL) for UE2 (block 145). The MMSE channel estimate may then be computed at block 155 according to:

$$\hat{H}_{MMSE2} = R_{HH}\left(R_{HH} + \frac{\beta}{SNR_2}I\right)^{-1}\hat{H}_{LS2} \qquad \text{Eq. (12)}$$

The channel estimation techniques shown and described with reference to FIG. 5 use knowledge of the DMRS for UE1 and UE2 to approximately generate the received reference signals for UE1 and UE2. The estimates are then canceled from the received signal. The interference canceled signals are then used to generate LS channel estimates using CSI-RS or SRS-based channel estimates. For low mobility devices, e.g., user terminals traveling at less than 60 km/hr, the previous CSI-RS or SRS-based channel estimates are sufficiently accurate to generate the approximate interference attributable to a user terminal 14.

Figure 6A:
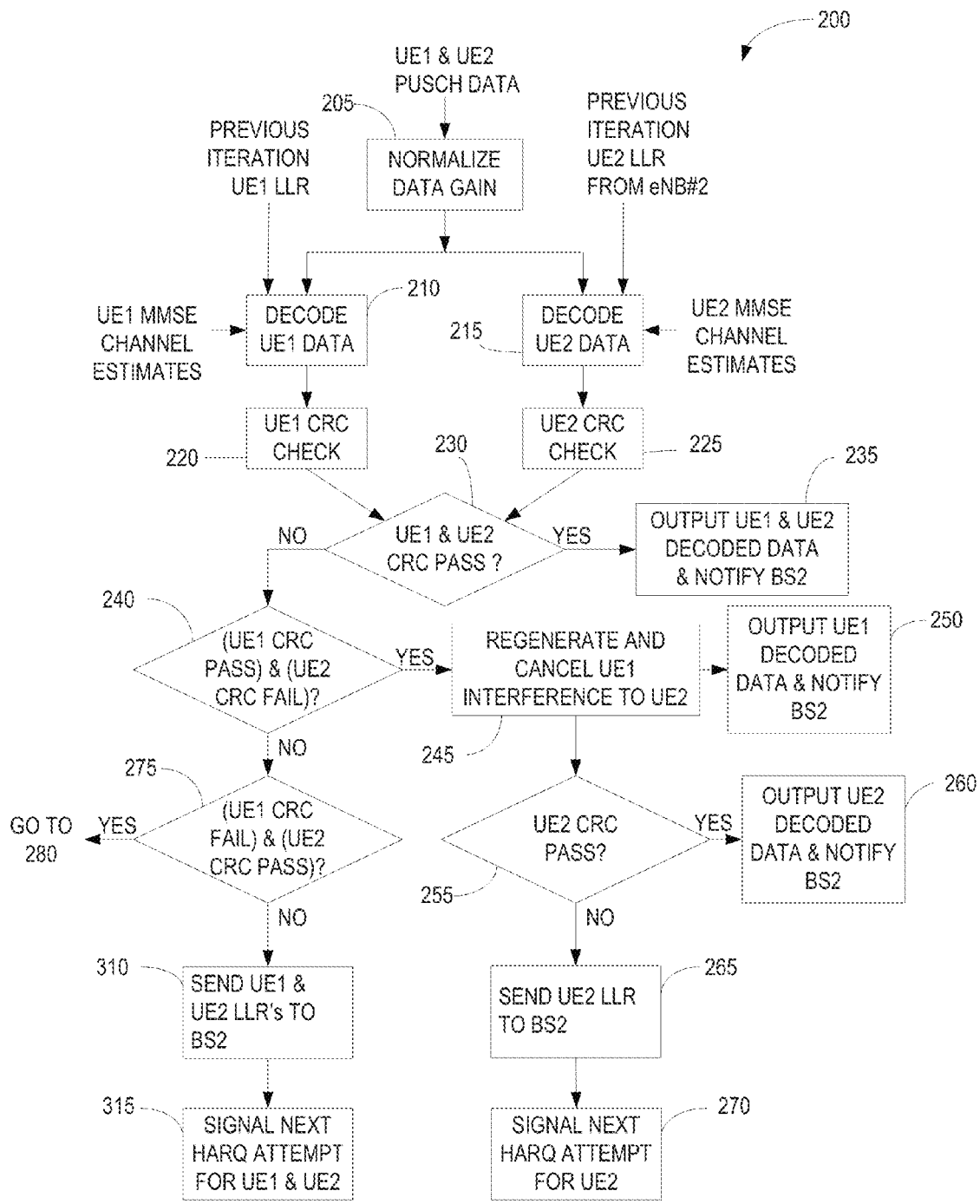
FIGS. 6A and 6B illustrates decoding and notification procedures performed by a coordinating base station implementing distributed V-MIMO processing for uplink transmissions.
Figure 6B:
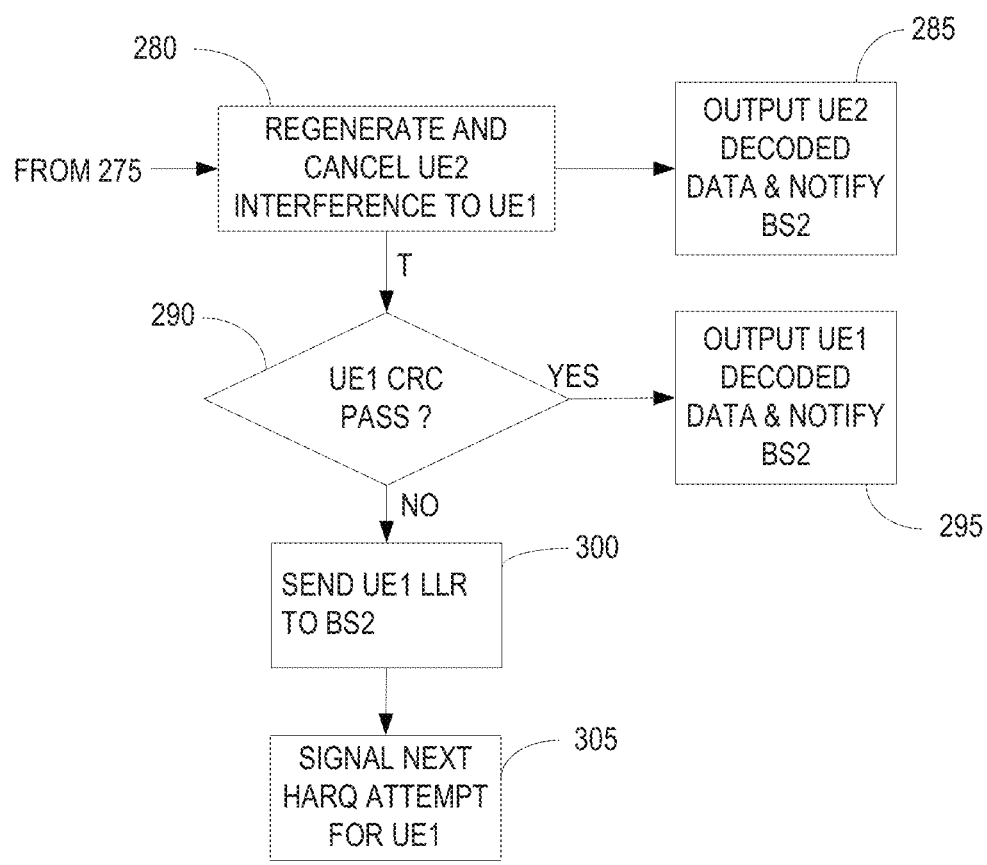

The reduced complexity channel estimates may be used by base station 12 to demodulate and decode the uplink signals received from UE1 and UE2. The data demodulation and decoding process for a V-MIMO system with two user terminals 14 according to one or more embodiments is shown in FIGS. 6a and 6b.

Initially, the base station 12 receives a combined PUSCH data signal containing the uplink signals from UE1 and UE2. In this example, it is assumed that the PUSCH signal is received in iteration n of a given HARQ process. Base station 12 normalizes the data gain of the combined PUSCH data signal (block 205). The uplink signals from UE1 and UE2 are then demodulated and decoded using the MMSE channel estimates and extrinsic information provided by a coordinating base station in the coordinating set (blocks 210, 215). The extrinsic information may comprise, for example, soft output values produced by the coordinating base station 12 in iteration n-1 of the HARQ process.

The decoded data is checked for errors to verify the successful decoding of the data signals (blocks 220, 225). The error detection may be performed using a cyclic redundancy check ("CRC") code. If the data signal for both UE1 and UE2 pass the CRC check (block 230), the decoded data for both UE1 and UE2 are output and forwarded to the coordinating base station 12 (block 235).

If the decoded data for UE1 passes the CRC check and the decoded data for UE2 fails (block 240), the decoded data and channel estimates of UE1 are used to regenerate the signal received from UE1 and cancel its interference from the composite received signal UE2 (block 245). The decoded data for UE1 is output and forwarded to the coordinating base station 12 in the coordinating set (block 250). The interference canceled signal for UE2 is then decoded a second time. The decoded data obtained for UE2 after interference cancellation is checked for errors to verify whether the decoding is successful (block 255). If the decoded data for UE2 passes the CRC check, the decoded data for UE2 is output and forwarded to the base station 12 in the coordinating set (block 260). If the decoded data for UE2 does not pass the CRC check (block 255), the base station 12 outputs the demodulated data for UE2 to the coordinating base station 12 in the coordinating set, which may be used as extrinsic information by the coordinating base station in the next iteration of the HARQ process (block 265). If the base station 12 is the serving base station for UE2 it sends a negative acknowledgement (NACK) to signal the next transmission for the HARQ process (block 270).

If the decoded data for UE1 fails the CRC check and the decoded data for UE2 passes (block 275), the decoded data and channel estimates of UE2 are used to regenerate the signal received from UE2 and cancel its interference from the composite received signal UE2 (block 280). The decoded data for UE2 is output and forwarded to the coordinating base station 12 in the coordinating set (block 285). The interference canceled signal for UE1 is then decoded a second time. The decoded data obtained for UE1 after interference cancellation is checked for errors to verify whether the decoding is successful (block 290). If the decoded data for UE1 passes the CRC check, the decoded data for UE1 is output and forwarded to the base station 12 in the coordinating set (block 295). If the decoded data for UE1 does not pass the CRC check (block 290), the base station 12 outputs the demodulated data for UE1 to the coordinating base station 12 in the coordinating set, which may be used as extrinsic information by the coordinating base station in the next iteration of the HARQ process (block 300). If the base station 12 is the serving base station for UE1, it sends a negative acknowledgement (NACK) to signal the next transmission for the HARQ process (block 325).

If the decoded data for both UE1 and UE2 fail the CRC check (block 275), the base station 12 outputs the demodulated data for both UE1 and UE2 to the coordinating base station 12 in the coordinating set (block 310), which may be used as extrinsic information by the coordinating base station 12 in the next iteration of the HARQ process. If the base station 12 is the serving base station for UE1 or UE2, it sends a negative acknowledgement (NACK) to signal the next transmission for the HARQ process (block 315).

Figure 7:
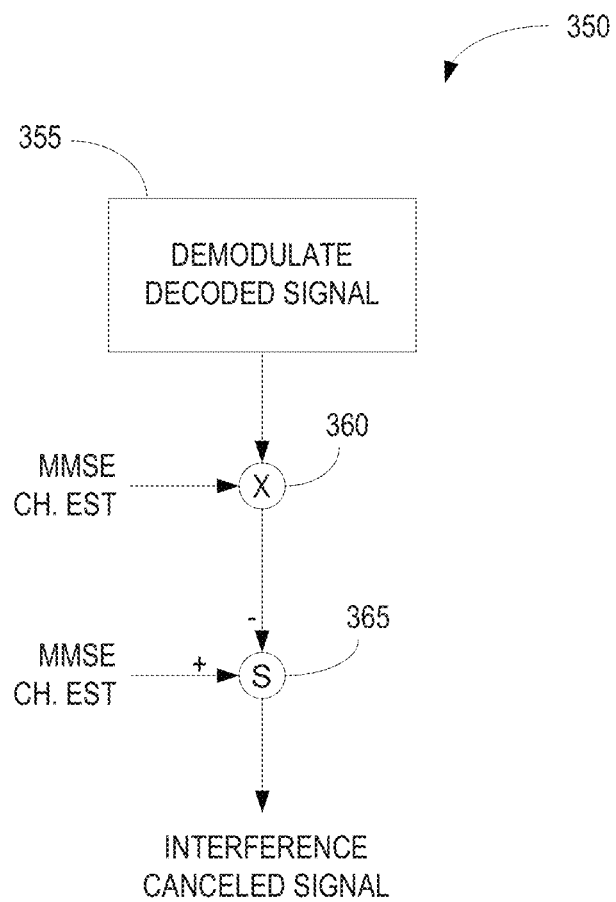
FIG. 7 illustrates a method of interference cancellation performed by a base station implementing distributed V-MIMO processing for uplink transmissions.

FIG. 7 illustrates an exemplary method 350 of regenerating and cancelling interference attributable to a successfully decoded signal from the composite received signal. The successfully decoded signal is modulated at 355 and multiplied with the corresponding MMSE channel estimates to form an estimate of the received component signal at 360. The received component signal is then subtracted at 365 from the composite received signal to generate an estimate of the received signal from UE2 plus noise.

Figure 8:
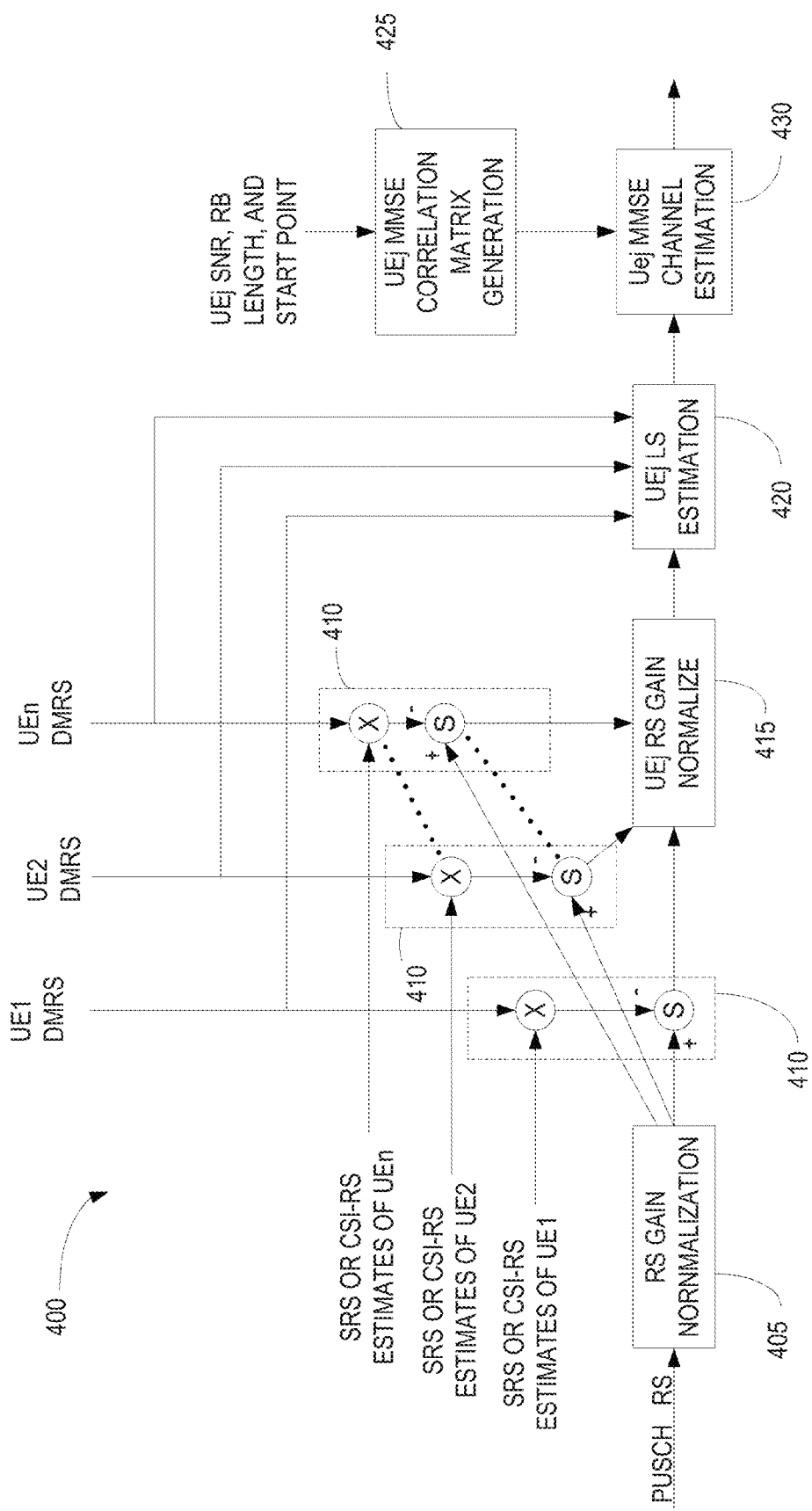
FIG. 8 illustrates a channel estimation method of channel estimation for distributed V-MIMO processing of uplink signals.

The distributed CoMP processing techniques described above may be extended to three or more user terminals 14. FIG. 8 illustrates a channel estimation procedure 400 for N>2 user terminals 14. The gain of the composite received signal is normalized (block 405). Assuming that UEj is of interest, the CSI-RS or SRS based channel estimates for UE1 to UEn, excluding UEj, are employed to regenerate and subtract the interfering reference signals from the composite reference signal (block 410). After normalizing the gain of the estimated reference signal for UEj (block 415), a LS channel estimate is generated (block 420). The LS channel estimate is input to an MMSE channel estimator. As previously described, the MMSE channel estimator generates a reduced complexity MMSE channel estimate from the least-square channel estimate and the MMSE correlation matrix for UEj (block 430). This process is repeated for each user terminal 14 from UE1 to UEn.

Figure 9:
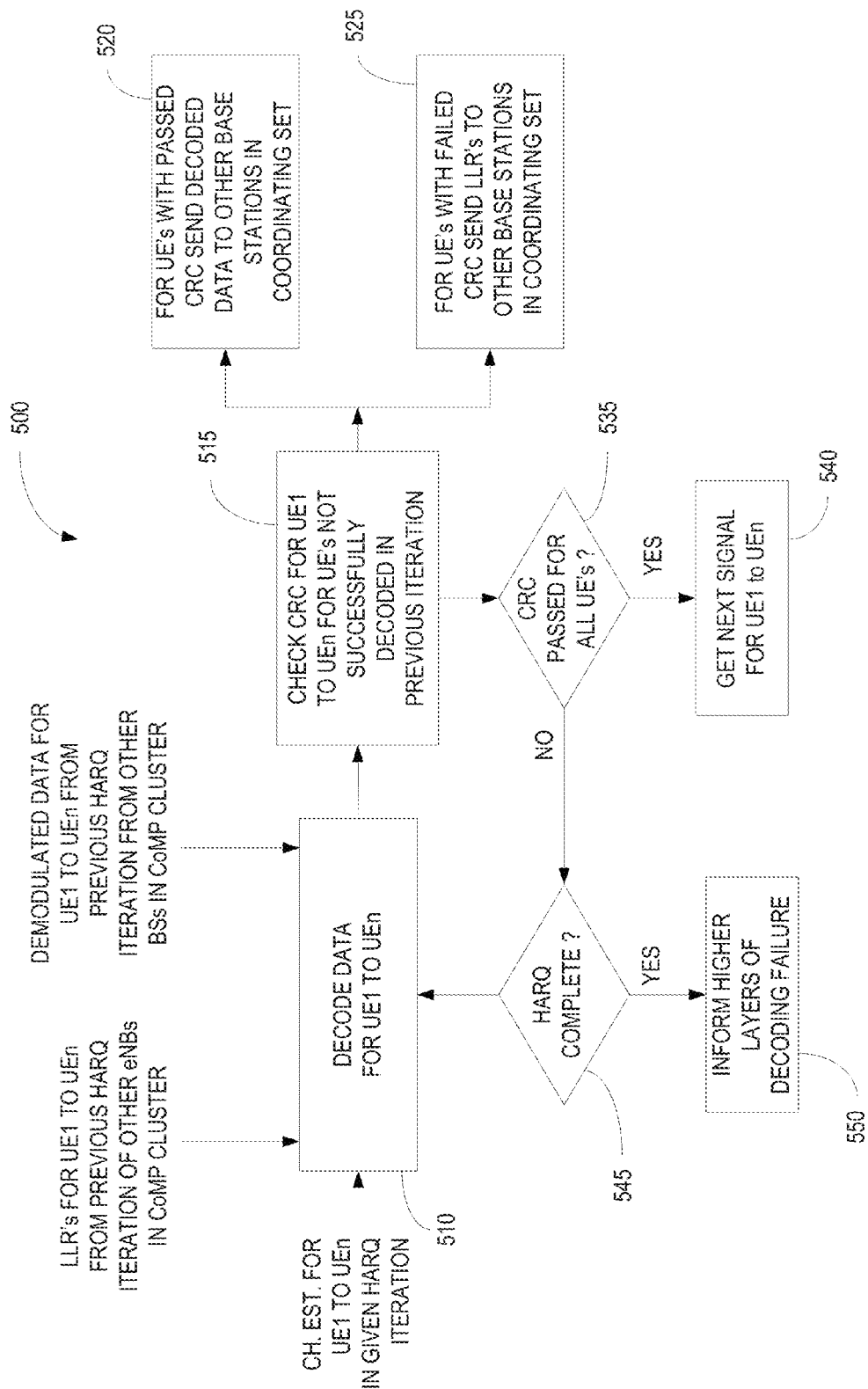
FIG. 9 illustrates decoding and notification procedures performed by a coordinating base station implementing distributed V-MIMO processing for uplink transmissions.

FIG. 9 illustrates the distributed demodulation and decoding process 500 for N>2 UEs according to one or more embodiments. Employing the MMSE channel estimates for UE1 to UEn obtained from the process shown in FIG. 8, each base station 12 in the coordinating set will attempt to demodulate and decode the data from UE1 to UEn in the first HARQ iteration (block 510). A CRC check is then performed to determine if the received signal for UEj is successfully decoded (block 515). If so, the base station 12 will send the decoded data for UEj to the other base stations in the coordinating set (block 520). If the signal from UEj is not successfully decoded, the base station 12 will send soft output values, e.g., LLRs, to the other base stations 12 in the coordinating set (block 525). In each subsequent iteration of the HARQ process, the base stations 12 again attempt to decode and demodulate the signals from UE1 to UEn that have not been successfully decoded.

During the subsequent iterations, new channel estimates may be generated for each user terminal 14. Note that user terminals 14 whose data was successfully decoded in the previous iteration will transmit data from a new packet in the subsequent iteration, whereas user terminals 14 whose data was not successfully decoded in the previous iteration will transmit another version of the same packet as dictated by the HARQ process. The demodulation and decoding may use the new channel estimates, along with extrinsic information from the previous iteration of the HARQ process received from the coordinating base stations 12. Note that in subsequent iterations, for a given user terminal 14, the LLR's from user terminals 14 that have not successfully decoded the data are employed as extrinsic information, as well as decoded data for user terminals 14 that have passed. The knowledge of the successfully decoded user terminal transmissions will be employed to cancel interference from the signal for the previous transmissions. This process may continue until the received signals from all UEs have been successfully decoded, or the maximum number of HARQ iterations is reached. Thus a check is performed to see if the received signals from all UEs have been successfully decoded (block 535) and if they have then a next signal for UE1 to UEn is processed (block 540). Otherwise, if the received signals from all UEs have not been successfully decoded, and a check is performed to see if the HARQ process is complete (block 545). If the maximum number of HARQ iterations is reached without decoding the signal for a user terminal 14, the higher layer protocols will be notified of the decoding failure (block 550).

Figure 10:
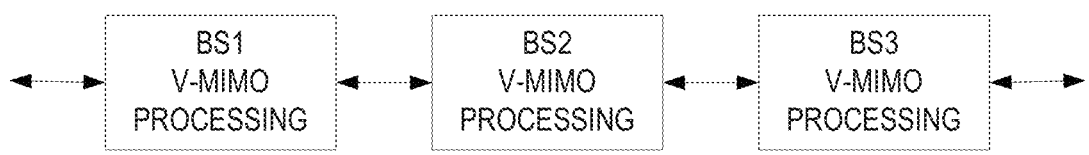
FIG. 10 illustrates a connection topology for distributed V-MIMO processing.
Figure 11:
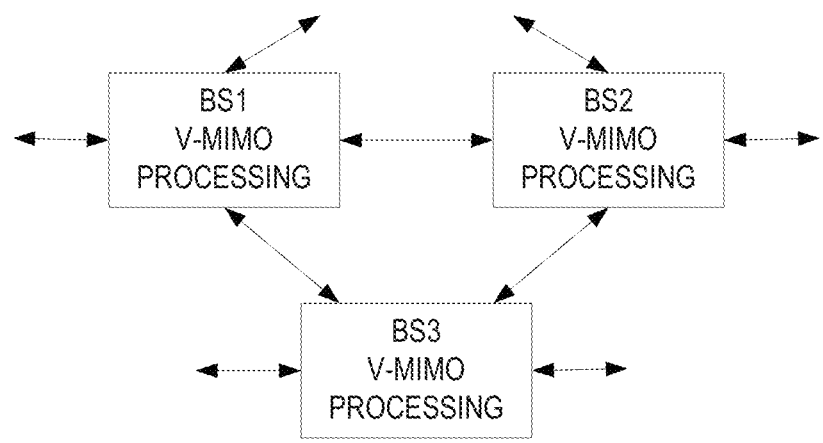
FIG. 11 illustrates a connection topology for distributed V-MIMO processing.

The distributed CoMP processing as herein described can be extended to coordinating sets including three or more coordinating base stations 12. Parallel, serial, or clustered connection typologies may be used for the base stations 12 in the coordinating set. FIGS. 10 and 11 illustrate two exemplary connection topologies for the coordinating set. In FIG. 10, the coordinating base stations are connected using a serial topology. In FIG. 11, the base stations are connected using a clustered topology. Other connection topologies are also possible.

In some embodiments of the invention, a base station 12 in a coordinating set may exchange extrinsic information with every other base station 12 in the coordinating set. In other embodiments, a base station 12 may exchange extrinsic information with a subset of the base stations 12 in the coordinating set. In some embodiments, a base station 12 may send extrinsic information to a first subset of base stations 12 in the coordinating set and receive extrinsic information from a second subset of base stations 12 in the coordinating set, and the first and second subsets may be different.

Figure 12:
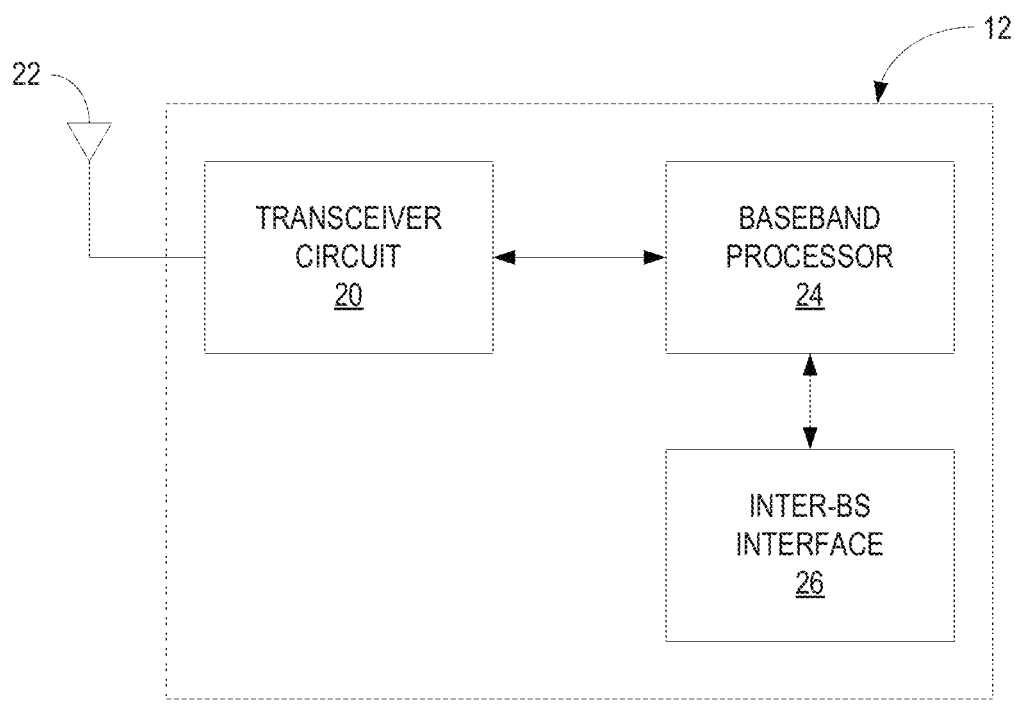
FIG. 12 illustrates a base station implementing distributed V-MIMO processing for uplink transmissions

FIG. 12 illustrates an exemplary base station 12 configured to implement distributed CoMP processing as herein described. The base station 12 comprises a transceiver circuit 20 for communicating with user terminals 14, a baseband processor 24 for processing the signals received from the user terminals 14, and an inter-base station interface 26 for communicating with other base stations 12 in the coordinating set. The transceiver circuit 20 couples to one or more antennas 22 and is configured to transmit signals to, and receive signals from, the user terminals 14 over a wireless channel. The baseband processor 24 is configured to process the signals transmitted and received by the base station 12. Such processing may include modulation, demodulation, coding, decoding, channel estimation, equalization, etc. The baseband processor 24 may comprise one or more digital signal processors, microprocessors, microcontrollers, application-specific integrated circuits (ASICS), field programmable gate arrays (FPGAs), other hardware circuits, or a combination thereof. The inter-base station interface 26 enables the base station 12 to exchange signals with other base stations 12. The inter-base station interface 26 may, as one example, comprise a standard Ethernet interface for communicating over an Ethernet network, or an IP interface for communicating over an IP network.

Figure 13:
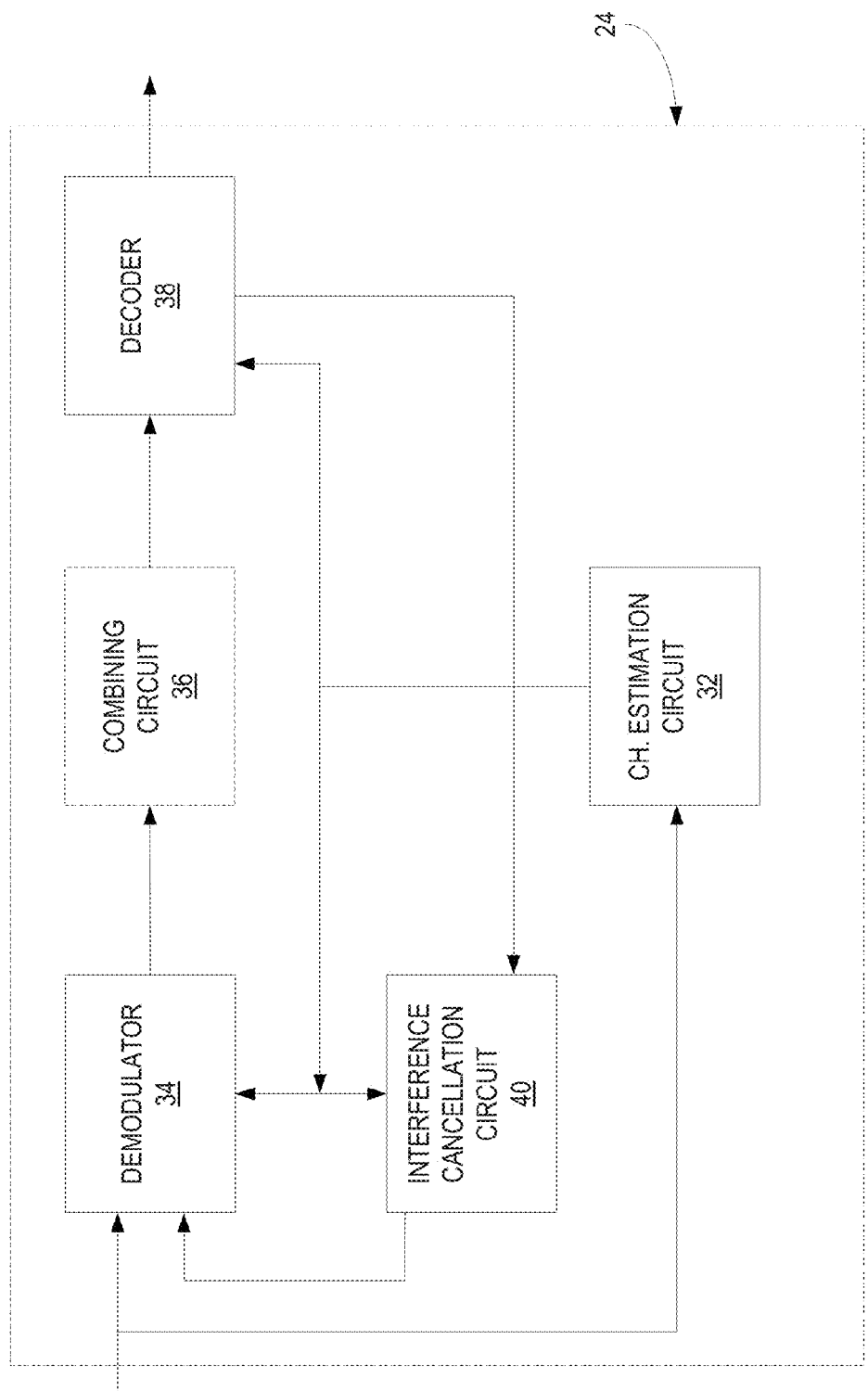
FIG. 13 illustrates the main functional components of baseband processing for a base station implementing distributed V-MIMO processing for uplink transmissions.

FIG. 13 illustrates the main functional components of the baseband processor 24 involved in the processing of received signals. The baseband processor 24 comprises a V-MIMO channel estimator 32, demodulator 34, optional combining circuit 36, V-MIMO decoder 38, and interference cancellation circuit 40. The V-MIMO channel estimator 32 is configured to generate the reduced complexity MMSE channel estimates as herein above described. The channel estimates output from the V-MIMO channel estimator 32 are provided to the demodulator 34, decoder 38, and interference cancellation circuit 40. The demodulator 34 is configured to demodulate the received signals using the V-MIMO channel estimates supplied by the channel estimator 32. The demodulated signals are input to the V-MIMO decoder 38 along with extrinsic information from other base stations 12. The V-MIMO decoder 38 performs iterative decoding as herein described. After each iteration of the decoding process, the V-MIMO decoder 38 performs a CRC check to determine whether decoding is successful. The interference cancellation circuit 40 receives the decoded signals output by the V-MIMO decoder 28. Using these decoded signals, the interference cancellation circuit 40 can regenerate and cancel the interference attributable to the decoded signals from the composite received signals to obtain interference canceled signals. The interference canceled signals may be supplied to the demodulator 34 for demodulation and subsequent decoding.

The exemplary embodiments of the invention as herein described provide a method for distributed and iterative decoding of received signals by a plurality of base stations in a coordinating set. By sharing extrinsic information between base stations, the likelihood of successful decoding of the uplink signals from the plurality of user terminals 14 is increased. As a consequence, fewer retransmissions will be required, thereby increasing user and aggregate cell throughput while decreasing network traffic between the base stations. The methods described herein enable the base station 12 with the most advantageously-received signal from a given user terminal to successfully demodulate and decode the uplink signal.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method implemented by a coordinating base station in a wireless communication network of distributed coordinated multi-point reception, said method comprising:
   receiving first and second data signals transmitted by first and second user terminals respectively on overlapping time-frequency resources;
   decoding the first and second data signals;
   verifying whether the decoding of the first and second data signals is successful; and
   if it is determined that at least one of the first and second data signals is successfully decoded, sending demodulated data or decoded data corresponding to at least one successfully decoded data signal to one or more additional coordinating base stations in a set of coordinating base stations.

2. The method of claim 1 wherein decoding the first and second data signals comprises:
   demodulating both the first and second data signals to produce soft output values that each indicate the value of a corresponding information symbol in the first and second data signals; and
   decoding the soft output values to obtain said decoded data.

3. The method of claim 2 wherein demodulating both the first and second data signals further comprises canceling interference in at least one of the first and second data signals that is attributable to the other one of the first and second data signals.

4. The method of claim 3 wherein canceling interference in at least one of the first and second data signals that is attributable to the other one of the first and second data signals comprises:
   regenerating an interference component attributable to one of the first and second data signals; and
   subtracting the regenerated interference component from the other one of the first and second data signals.

5. The method of claim 3 wherein canceling interference is performed in the frequency or time domain.

6. The method of claim 2 further comprising, if it is determined that one of the first and second data signals is not successfully decoded, sending soft output values corresponding to an estimate of the unsuccessfully decoded data signal to the one or more additional coordinating base stations in the set of coordinating base stations.

7. The method of claim 1 further comprising:
   receiving, from an additional coordinating base station in the set of cooperating base stations, soft output values that each indicate the value of a corresponding information symbol in one of the first and second data signals; and
   wherein decoding the first and second data signals is performed using the soft output values received from the additional coordinating base station.

8. The method of claim 7 wherein decoding the first and second data signals using the soft output values received from the additional coordinating base station comprises:
   demodulating the received data signals to produce soft output values that each indicate the value of a corresponding information symbol in the first and second data signals;
   combining the produced soft output values with corresponding ones of the received soft output values to produce combined soft output values; and
   decoding the combined soft output values to obtain said decoded data.

9. The method of claim 8 wherein the received soft output values for at least one of the first and second data signals correspond to information symbols transmitted in a first transmission period, and wherein the produced soft output values are combined with information symbols transmitted in a second transmission period subsequent to the first transmission period.

10. The method of claim 1 further comprising:
    receiving a combined control channel signal containing information reference signals for said first and second user terminals respectively;
    generating first channel estimates for the first and second user terminals;
    generating separate control channel signals for one of the first and second user terminals by canceling interference in the combined control channel signals attributable to the other one of the user terminals; and
    generating second channel estimates for the first and second user terminals from the separate control channel signals for use in decoding the first and second data signals.

11. The method of claim 10 wherein generating the second channel estimates is performed using a minimum mean square error method.

12. The method of claim 10 wherein generating the second channel estimates is performed in the frequency domain.

13. The method of claim 10 wherein generating the first channel estimates is performed using channel estimates received from an additional coordinating base station in the set of coordinating base stations.

14. The method of claim 1 wherein the base station is a serving base station for one of the user terminals, and the method further comprising sending an acknowledgement to said first user terminal to indicate whether the decoding of the first data signal is successful.

15. The method of claim 14 wherein a coordinating base station in said set of coordinating base stations is a serving base station for the second user terminal.

16. A base station in a wireless communication network, said base station comprising:
    a transceiver circuit for receiving first and second data signals on overlapping time-frequency resources from first and second user terminals respectively;
    a backhaul interface for communicating with coordinating base stations in a set of coordinating base stations; and
    a processing circuit for processing the received data signals, said processing circuit configured to:
        decode the first and second data signals;
        verify whether the decoding of the first and second data signals is successful; and
        if it is determined that at least one of the first and second data signals is successfully decoded, send demodulated data or decoded data corresponding to at least one successfully decoded data signal to one or more additional coordinating base stations in the set of coordinating base stations.

17. The base station of claim 16 wherein the processing circuit comprises:
    a demodulator configured to demodulate both the first and second data signals to produce soft output values that each indicate the value of a corresponding information symbol in the first and second data signals; and
    a decoder configured to decode the soft output values to obtain said decoded data, and verify whether the decoding is successful.

18. The base station of claim 17 wherein the processing circuit further comprises an interference cancellation circuit configured to cancel interference in a first one of the first and second data signals that is attributable to the other one of the first and second data signals.

19. The base station of claim 18 wherein the interference cancellation circuit is configured to:
    regenerate an interference component attributable to one of the first and second data signals; and
    subtract the regenerated interference component from the other one of the first and second data signals.

20. The base station of claim 18 wherein the interference cancellation circuit is configured to perform interference cancellation in the frequency domain or time domain.

21. The base station of claim 17 wherein the processing circuit is further configured to, if it is determined that one of the first and second data signals is not successfully decoded, send soft output values corresponding to the unsuccessfully decoded data signal to one or more coordinating base stations in a set of coordinating base stations.

22. The base station of claim 16 wherein the processing circuit is further configured to:
    receive, from a coordinating base station in the set of cooperating base stations, soft output values that each indicate the value of a corresponding information symbol in one of the first and second data signals; and
    decode the first and second data signals using the soft output values received from the coordinating base station.

23. The base station of claim 22 wherein the processing circuit further comprises:
    a demodulator configured to demodulate the received data signals to produce soft output values that each indicate the value of a corresponding information symbol in the first and second data signals;
    a combining circuit configured to combine the produced soft output values with corresponding ones of the received soft output values to produce combined soft output values; and
    a decoder configured to decode the combined soft output values to obtain said decoded data.

24. The base station of claim 23 wherein the received soft output values for at least one of the first and second data signals correspond to information symbols transmitted in a first transmission period, and wherein the produced soft output values are combined with information symbols transmitted in a second transmission period subsequent to the first transmission period.

25. The base station of claim 16 wherein the processing circuit further comprises a channel estimation circuit configured to:
    receive a combined control channel signal containing information reference signals for said first and second user terminals respectively;
    generate first channel estimates for the first and second user terminals;
    generate separate control channel signals for one of the first and second user terminals by canceling interference in the combined control channel signals attributable to the other one of the user terminals; and
    generate second channel estimates for the first and second user terminals from the separate control channel signals for use in decoding the first and second data signals.

26. The base station of claim 25 wherein the channel estimation circuit is configured to generate the second channel estimates using a minimum mean square error method.

27. The base station of claim 25 wherein the channel estimation circuit is configured to generate the second channel estimates in the frequency domain.

28. The base station of claim 25 wherein the channel estimation circuit is configured to generate the first channel estimates using channel estimates received from a coordinating base station in the set of coordinating base stations.

29. The base station of claim 16 wherein the base station is a serving base station for one of the user terminals, and wherein the processing circuit is further configured to send an acknowledgement to said first user terminal to indicate whether the decoding of the first data signal is successful.

30. The base station of claim 29 wherein a coordinating base station in said set of coordinating base station is a serving base station for the second user terminal.

* * * * *

UNITED STATES PATENT AND TRADEMARK OFFICE
CERTIFICATE OF CORRECTION

PATENT NO. : 9,071,922 B2
APPLICATION NO. : 13/661360
DATED : June 30, 2015
INVENTOR(S) : Boudreau et al.

Page 1 of 1

It is certified that error appears in the above-identified patent and that said Letters Patent is hereby corrected as shown below:

In the Specification

In Column 5, Line 62, delete "$\hat{H}_L{}^s = X^{-1}y$" and insert -- $\hat{H}_{L_s} = X^{-1}y$ --, therefor.

Signed and Sealed this
Twelfth Day of April, 2016

Michelle K. Lee
*Director of the United States Patent and Trademark Office*